United States Patent [19]

Ohtsuka et al.

[11] Patent Number: 4,910,468

[45] Date of Patent: Mar. 20, 1990

[54] DUAL POLARIZATION DEMODULATION WITH CROSS POLARIZATION CANCELLATION

[75] Inventors: Hiroyuki Ohtsuka; Hideaki Matsue, both of Kanagawa; Tadashi Shirato, Tokyo; Takehiro Murase, Kanagawa, all of Japan

[73] Assignee: Nippon Telegraph and Telephone Corporation, Tokyo, Japan

[21] Appl. No.: 310,462

[22] Filed: Feb. 15, 1989

Related U.S. Application Data

[63] Continuation of Ser. No. 50,664, May 18, 1987, abandoned.

[30] Foreign Application Priority Data

May 19, 1986 [JP] Japan .................................. 61-112511
May 22, 1986 [JP] Japan .................................. 61-116114
Nov. 7, 1986 [JP] Japan .................................. 61-263660

[51] Int. Cl.⁴ .............................................. H04B 1/12
[52] U.S. Cl. .................................... 329/316; 329/320; 375/102; 455/295; 455/306
[58] Field of Search ................. 329/50, 104, 112, 146; 375/14, 15, 58, 96, 99, 102; 455/60, 63, 65, 283, 284, 295, 303, 305, 306; 370/6; 342/188

[56] References Cited

U.S. PATENT DOCUMENTS

4,575,862 3/1986 Tahara et al. .................... 455/296 X
4,577,330 3/1986 Kavehrad ............................. 375/15
4,606,054 8/1986 Amitay et al. ..................... 375/102
4,688,235 8/1987 Tahara et al. ..................... 455/60 X Primary Examiner—Siegfried H. Grimm
Attorney, Agent, or Firm—Armstrong, Nikaido, Marmelstein, Kubovcik & Murray

[57] ABSTRACT

In a digital demodulation system (FIGS. 2, 3, 4, 7, 8) in a dual polarization radio system, having a first demodulator (4) and a first A/D converter (14) for a main signal, a second demodulator (5) and a second A/D converter (15c) for an interference signal (cross polarization signal), a transversal filter (18) for providing a compensation signal for cancelling an interference component in the main signal depending upon the demodulated interference component; the second A/D converter (15c) for providing the interference component in digital form is operated with a clock signal (102) regenerated in the main signal branch (4, 14) so that system operates correctly even when the main signal and cross polarization signal are in an asynchronous condition. The A/D converter (14, 15c, 105) is provided with an attenuator (104) for compressing amplitude of an input signal to avoid saturation of the circuit (105) in case of fading and/or distortion, and a ROM table (107) for correcting digitalized output after equalization and/or cancellation. Tap coefficients of the transversal filter (18) are obtained by a control (19) through a ZF method when inter-symbol interference is small, and a MLE method when inter-symbol interference is large. Further, an integration constant for the coefficients is adaptive depending upon inter-symbol interference.

4 Claims, 10 Drawing Sheets

DUAL POLARIZATION DEMODULATION WITH CROSS POLARIZATION CANCELLATION

This application is a continuation of application Ser. No. 050,664 filed May 18, 1987 and now abandoned.

BACKGROUND OF THE INVENTION

The present invention relates to a digital signal demodulation system, in particular, relates to such a system which is free from waveform distortion and/or cross polarization interference by fading.

We have first considered a digital signal demodulation system with a cross polarization interference canceller as shown in FIG. 1. In the figure, each of main signal which suffers from interference, and an interference signal is demodulated by each of demodulators, DEM(A), and DEM(B), respectively. The demodulated signal is applied to an analog-digital converter (A/D(A), A/D(B)), which converts an input analog signal to digital form through sampling of an input signal using the clock signal regenerated in each branch. A transversal filter is used to cancel the interference component in the main signal. The output of the analog-digital converter A/D(B) in the interference branch is applied to the transversal filter, the output of which is applied to the combiner, which also receives the output of the analog-digital converter A/D(A) in the main branch. Thus, the interference component in the main branch is cancelled in the combiner. The tap coefficient of the transversal filter is controlled by the Control using a zero-forcing (ZF) method which provides the tap coefficient by obtaining the decision bit which shows a polarity of a signal, and an error signal; multiplying polarity of the decision signal and the polarity of the error signal; and integrating the product.

However, the configuration of FIG. 1 has the following disadvantages.

(a) When an analog input signal is higher than the allowable upper level of an analog-digital converter, the A/D converter saturates. This condition occurs when an input signal is distorted by waveform distortion and/or interference. The saturation of the A/D converter would essentially provide non-linear distortion, and deteriorate the compensation ability of a transversal filter.

(b) When a signal of a second polarization branch does not synchronize with the signal of a first polarization branch, the operation in the transversal filter and the combiner is asynchronous, and in that condition, the cancellation of an interference component is impossible.

(c) A prior ZF (zero-forcing) method for providing a tap coefficient of a transversal filter does not operate well when the inter-symbol interference is large, and further, the pull-in range for convergence becomes narrow when it becomes out of control, and deteriorates the characteristics of the demodulation system itself.

SUMMARY OF THE INVENTION

It is an object, therefore, of the present invention to overcome the disadvantages and limitations of a prior digital signal demodulation system by providing a new and improved digital signal demodulation system.

It is also an object of the present invention to provide a digital signal demodulation system which operates correctly even when an input signal is extremely distorted, and/or it suffers from heavy interference.

It is also an object of the present invention to provide a digital signal demodulation system which operates correctly even when two polarization signals are asynchronous with each other.

It is also an object of the present invention to provide a digital signal demodulation system which operates correctly even when an inter-symbol interference is large, and/or the operation of a transversal filter becomes out of control.

The above and other objects are attained by a digital signal demodulation system having a first demodulator (4) for demodulating a first polarization signal; a second demodulator (5) for demodulating a second polarization signal; a first A/D converter (14) coupled with an output of the first demodulator (4), operating with a clock signal regenerated by the first demodulator (4); a second A/D converter (15c) coupled with an output of the second demodulator (5), and the second A/D converter (15c) operating with the clock signal regenerated by the first demodulator (4); a transversal filter (18) coupled with an output of the second A/D converter (15c) for providing a compensation signal from the second A/D converter (15c) output; a combiner (17) coupled with an output of the first A/D converter (14) and an output of the transversal filter (18); a control (19) coupled with an output of the combiner (17) and the output of the second A/D converter (15c), for adjusting tap coefficients of the transversal filter (18); and an output terminal (OUT1) coupled with the output of the combiner (17) to provide a demodulated first polarization signal.

Preferably, the A/D converter has an attenuator (104) at an input of the A/D converter, and a modification circuit implemented by a ROM table coupled with the output of the transversal filter (106).

Still preferably, the control (19) changes the operation between a ZF method, and a MLE method, and the integration time of the product of a decision signal and an error signal is adaptive, depending upon inter-symbol interference.

BRIEF DESCRIPTION OF THE DRAWINGS

The foregoing and other objects, features, and attendant advantages of the present invention will be appreciated as the same becomes better understood by means of the following description and accompanying drawings wherein.

DESCRIPTION OF THE PREFERRED EMBODIMENTS

Figure 2:
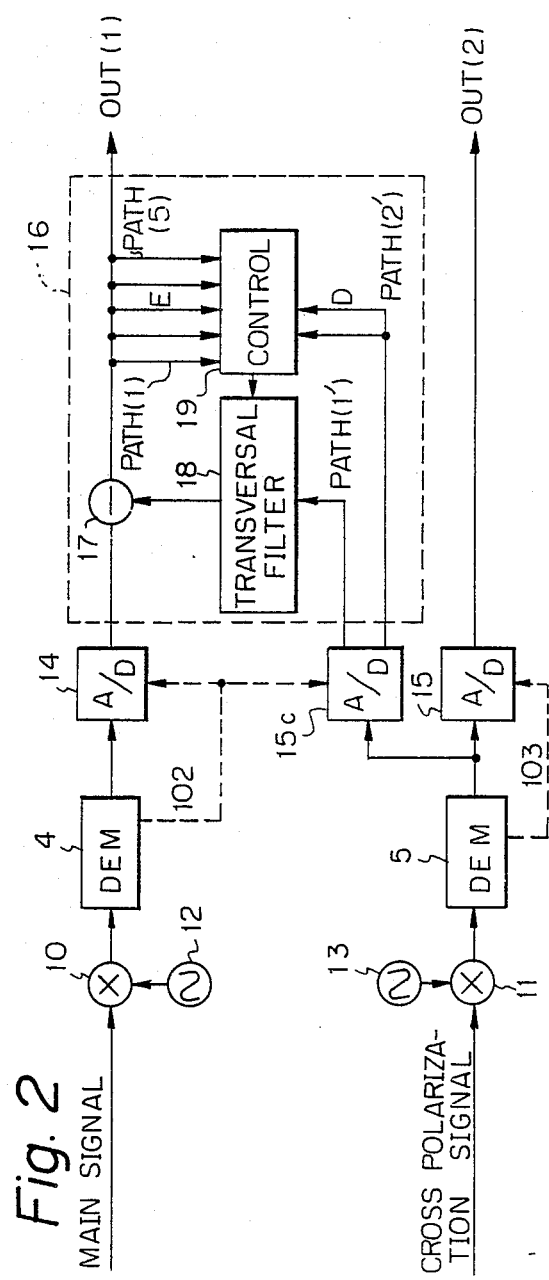
FIG. 2 is a block diagram of a digital demodulator with a cross polarization interference canceller according to the present invention.

FIG. 2 shows a block diagram of the digital signal demodulation system for dual polarization transmission. In the figure, the numeral 12 is a local oscillator for a main polarization signal, 13 is a local oscillator for a cross polarization signal, 4 is a demodulator for a main polarization signal, 5 is a demodulator for a cross polarization signal, 14 is an A/D (analog digital) converter which converts an input signal of a main polarization signal to a digital form with enough quantization using the reference clock signal regenerated by the demodulator 4 in the main polarization branch. The numeral 15 is an A/D converter for converting a cross polarization input signal to a digital form with enough quantization using the reference clock signal regenerated by the demodulator 5 in the cross polarization branch. The numeral 15c is an A/D converter for converting a cross polarization signal to a digital form with enough quantization using the reference clock signal regenerated by the demodulator 4 in the main polarization branch. The numeral 16 is a cross polarization interference canceller, which has a subtractor or a combiner 17, a transversal filter 18, and a control 19 for adjusting tap coefficients of the transversal filter 18.

The important feature of the apparatus of FIG. 2 is that the A/D converter 15c in the cross polarization branch is supplied with the reference clock signal 102 in the main polarization branch to provide the cross polarization signal. It should be noted in that configuration that the error signal E applied to the control 19 from the main polarization branch is synchronized with the decision signal D applied to the control 19 from the cross polarization branch, even when the cross polarization signal is asynchronous with the main signal. Of course, two inputs of the subtractor 17 are synchronized with each other.

Figure 1:
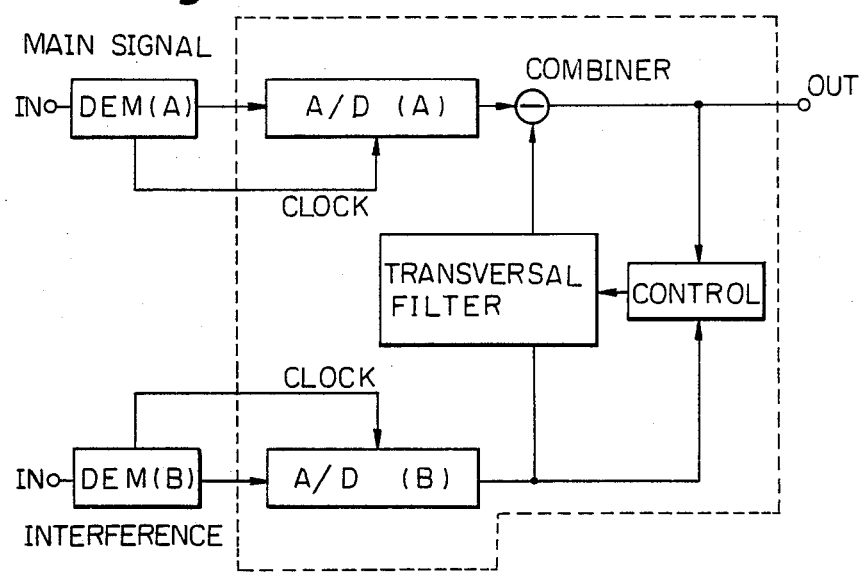
FIG. 1 is a block diagram of a digital demodulator with an equalizer in the prior art.

It should be appreciated that the configuration of FIG. 2 can cancel the interference component even when the main polarization branch is asynchronous with the cross polarization branch. The configuration of FIG. 1 can not operate correctly when two signals in two branches are asynchronous.

Figure 3:
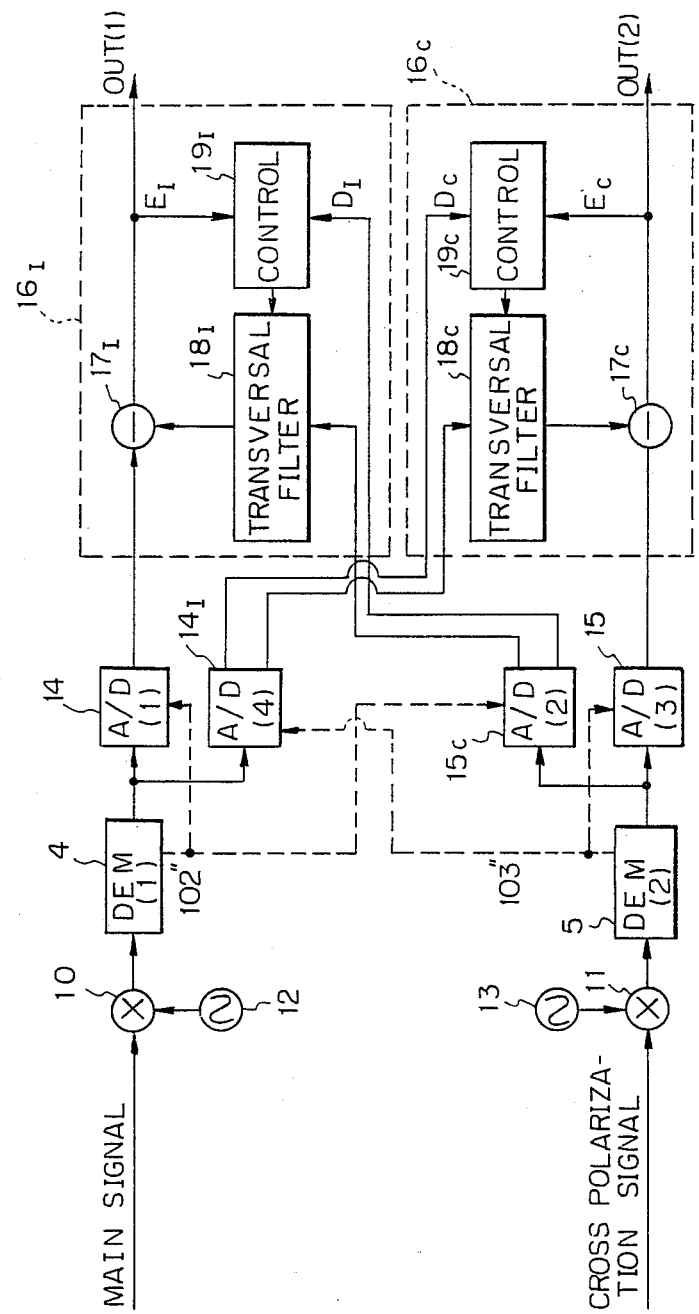
FIG. 3 is a block diagram of another embodiment of the digital demodulator with a cross polarization interference canceller according to the present invention.

FIG. 3 is another embodiment of the present invention, in which the interferences in both main polarization branch and cross polarization branch are cancelled. The output of the demodulator 4 in the main polarization branch is applied to the A/D converter 14 for the main polarization signal, and the A/D converter $14_I$ for the compensation of the interference from the main branch to the cross branch. The A/D converter 14 operates with the reference clock signal 102" of the main polarization branch, and the A/D converter $14_I$ operates with the reference clock signal 103" of the cross polarization branch. Similarly, the output of the demodulator 5 in the cross polarization branch is applied to the A/D converter 15 for the cross polarization signal, and the A/D converter 15c for the compensation of the interference from the cross polarization branch to the main polarization branch. The A/D converter 15 operates with the reference clock signal 103" for the cross polarization branch, and the A/D converter 15c operates with the reference clock signal 102" for the main polarization signal.

The numeral $16_I$ is a cross polarization interference canceller for the main branch. The control $19_I$ in that canceller $16_I$ receives the error signal $E_I$ in the main polarization signal and the decision signal $D_I$ in the cross polarization signal to provide the correlation of those two signals to control the transversal filter $18_I$ which receives the output of the A/D converter 15c. Thus, the interference from the cross polarization signal to the main polarization signal is cancelled. Similarly, the numeral 16c is the cross polarization interference canceller for the cross polarization signal so that the interference from the main polarization signal to the cross polarization signal is cancelled.

It should be noted in FIGS. 2 and 3 that the cross polarization interference is cancelled by using a digital circuit in the baseband even when the main polarization signal is asynchronous with the cross polarization signal. Further, the present invention has the advantage that the separate local oscillators can be used for a main branch and a cross branch, although a common local oscillator must be used in a prior art. Further, the present invention has the advantage that no quadrant judgement circuit is necessary which has been essential in a prior interference canceller operating in an IF band.

Figure 5B:
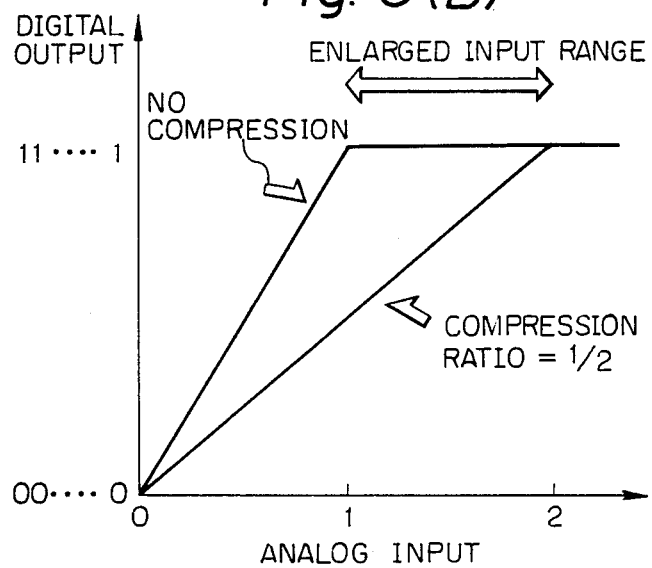
FIGS. 5A and 5B are explanatory drawings of the operation of FIG. 4.
Figure 4:
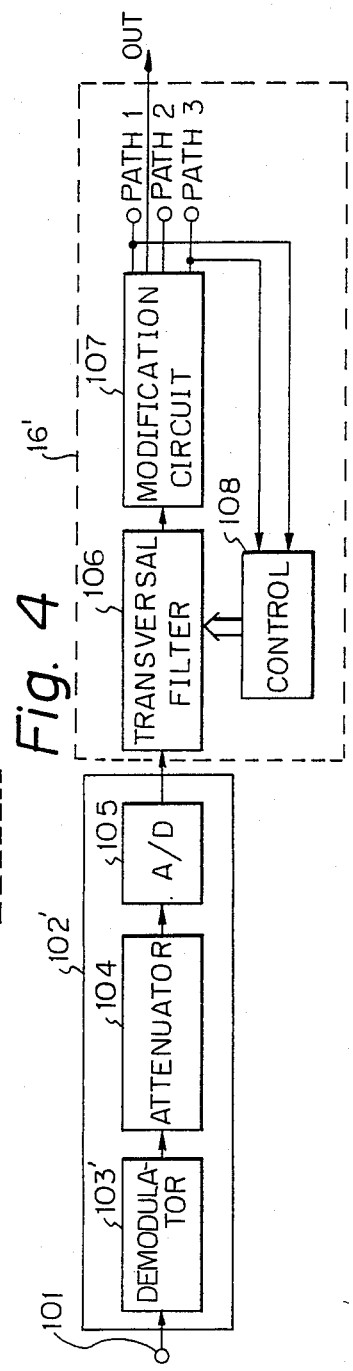
FIG. 4 is a block diagram of a digital demodulator with an equalizer according to another embodiment of the present invention.
Figure 5A:
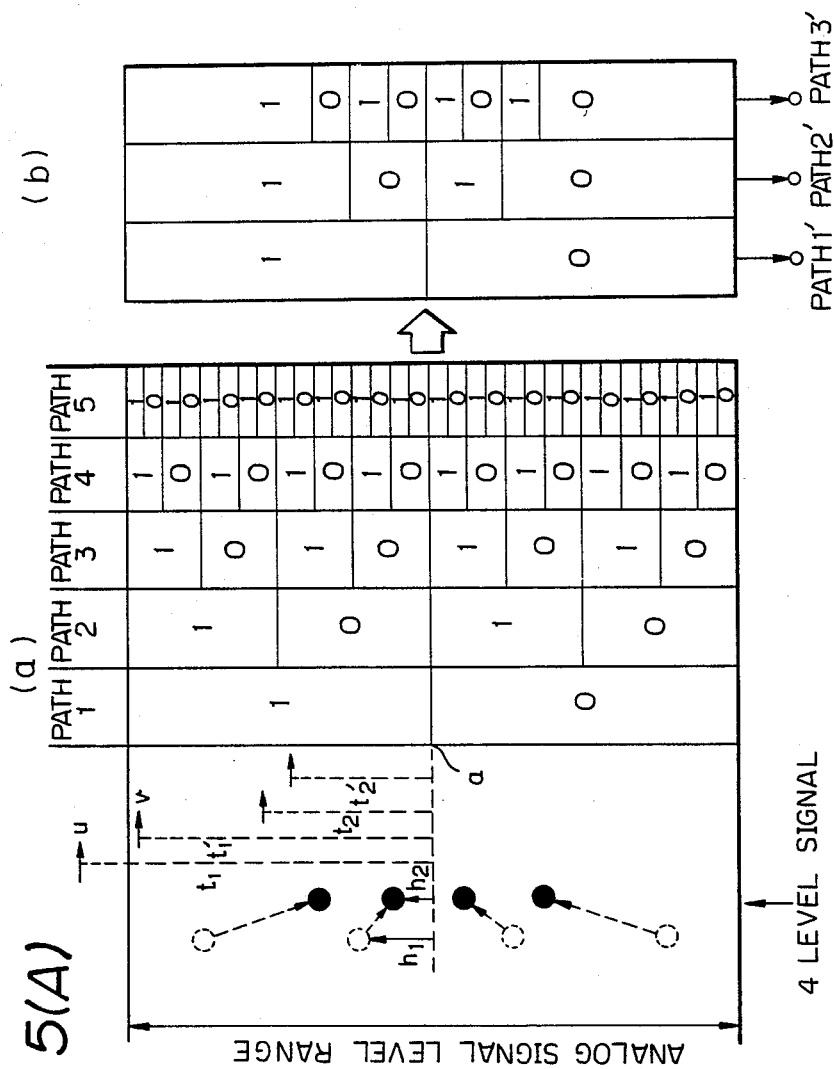
Figure 6:
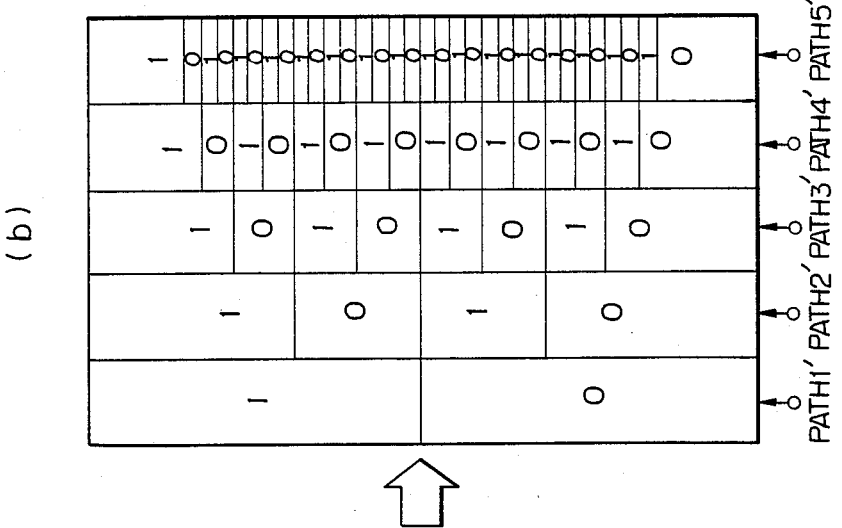
FIG. 6 is another explanatory drawing of the operation of FIG. 4.
Figure 6:
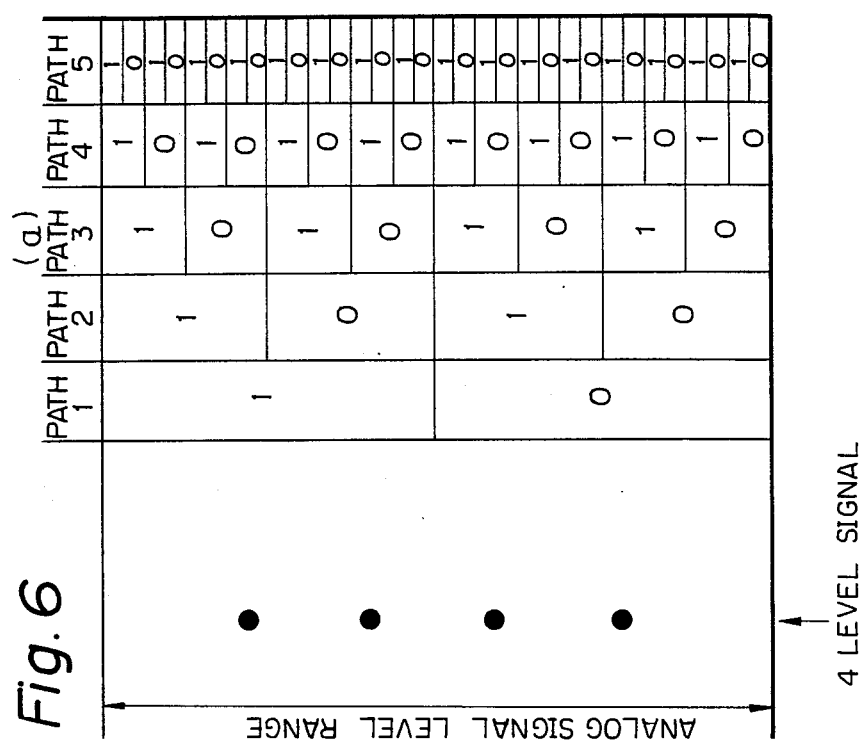

Next, the improvement of an A/D converter in FIGS. 2 and 3 is described in accordance with the embodiment shown in FIGS. 4 through 6.

FIG. 4 shows an improved A/D converter. It shows also a transversal filter and the control for a single channel for the sake of the simplicity of the explanation. FIG. 4 shows that the transversal filter is used as an equalizer for one branch.

In FIG. 4, the numeral 101 is an input terminal, which corresponds to the output of the mixer (10, 11 in FIGS. 2 and 3). The numeral 103' is a demodulator which is the same as the demodulator 4 or 5 in FIGS. 2 and 3. The numeral 104 is an attenuator, the numeral 105 is an A/D converter, which is the same as the A/D converter $14_I$, or 15c in FIGS. 2 and 3. The numeral 106 is a transversal filter which is the same as that of 18, 18c or $18_I$ in FIGS. 2 and 3. The numeral 107 is a modification circuit. The numeral 108 is a control for determining the tap coefficient of the transversal filter, and is the same as that 19, $19_I$ or 19c in FIGS. 2 and 3. The numeral 102' shows merely the combination of the demodulator, the attenuator and the A/D converter while 16' functions essentially the same as cancelers 16, $16_I$ or 16c except that the modification circuit 107 is provided so that the attenuation by the attenuator 104 is compensated, as discussed below.

The feature of FIG. 4 is the presence of the attenuator 104 at the input of the A/D converter 105, and the modification circuit 107 coupled with the output of the transversal filter 106. Further, the A/D converter 105 has a number of output bits greater than the number of the necessary decision bits.

The advantage of the configuration of FIG. 4 is that the A/D converter operates correctly even when the input signal level exceeds the allowable upper limit of the A/D converter. The input signal level would exceed that allowable upper level in case of fading, and/or distortion.

The operation of FIG. 4 is described in accordance with FIGS. 5A and 5B, in which it is assumed that the attenuator 104 compresses the signal level to half ($\frac{1}{2}$).

Assuming that the reference level is the middle point (a) in the input signal level range, the outputs of the demodulator 103' as shown by the dotted circles are compressed to the black circles by the attenuator 104 which compresses the input signal level to half level. For instance, the signal having the level $h_1$ is compressed to the signal having the level $h_2$ ($h_2 = \frac{1}{2} h_1$). The level $h_2$ is converted to digital form by the A/D converter, which provides the 5 decision outputs (path 1 through path 5), among which 3 decision outputs are taken.

The effect of the attenuator is clearly understood when the input signal level exceeds the allowable analog signal level range. When the signal u with the level $t_1$ which is higher than the allowable upper level, is output by the demodulator 103', the digital output of that input signal would be (1,1,1,1). Similarly, when the input signal v having the level $t_1'$ which is within the allowable range, the digital output would also be (1,1,1,1). Therefore, although the signal level of v differs from that of u, the digital outputs of the two signals would be the same as each other.

When the attenuator 104 is provided, the level $t_1$ of the signal u is compressed to $t_2$, and the level $t_1'$ of the signal v is compressed to $t_2'$. Therefore, the digitalized outputs of those signals are (1,1,0,0) and (1,0,1,1), respectively. So, those two signals u and v are clearly differentiated. The compressed digital outputs are corrected by the modification circuit 107, which will be described later.

FIG. 5B shows above compression, in which the horizontal axis shows input analog signal level, and the vertical axis shows output digital signal level. When no attenuator is provided, the allowable upper level of the input signal is 1, which provides the digital output (1,1,1,1). On the other hand, when the attenuator with the compression ratio $\frac{1}{2}$ is provided, the allowable upper level of the input signal is 2, which is twice as high as the former case. Therefore, due to the pressure of the attenuator, the A/D converter does not saturate even in case of fading and/or distortion.

The modification circuit 107 corrects the compressed digital outputs. That modification circuit is implemented by a ROM table. FIG. 5A shows the embodiment in which the A/D converter has 5 output bits, among which 4 outputs are used, and the modification circuit provides three output bits. As mentioned before, the signal v is first converted to (1,0,1,1). That digital signal (1,0,1,1) is modified to (1,1,1) in the modification circuit. The final output (1,1,1) is the same as the decision signal of the signal v when no attenuator is provided.

FIG. 5A (b) shows the content of the ROM table of the modification circuit. The relation of the input level and the output level of the modification circuit is shown in the table 1, which is the same as FIG. 5A.

TABLE 1

| Input signal | Output signal |
|---|---|
| 1,1,1,1 | 1,1,1 |
| 1,1,1,0 | 1,1,1 |
| 1,1,0,1 | 1,1,1 |
| 1,1,0,0 | 1,1,1 |
| 1,0,1,1 | 1,1,1 |
| 1,0,1,0 | 1,1,0 |
| 1,0,0,1 | 1,0,1 |
| 1,0,0,0 | 1,0,0 |
| 0,1,1,1 | 0,1,1 |
| 0,1,1,0 | 0,1,0 |
| 0,1,0,1 | 0,0,1 |

TABLE 1-continued

| Input signal | Output signal |
|---|---|
| 0,1,0,0 | 0,0,0 |
| 0,0,1,1 | 0,0,0 |
| 0,0,1,0 | 0,0,0 |
| 0,0,0,1 | 0,0,0 |
| 0,0,0,0 | 0,0,0 |

It should be appreciated that if the input signal to a transversal filter is saturated to (1,1,1) or (0,0,0), the equalization ability of a transversal filter is considerably deteriorated. The present invention is advantageous to operate a transversal filter effectively in case of fading and/or distortion.

The embodiment of FIGS. 5A and 5B in which the compression ratio is $\frac{1}{2}$ is described only for the explanation of the principle of the present invention. In a practical application, the compression ratio $\frac{1}{2}$ would be too large, and that large compression ratio would decrease the quantization and the gain of an A/D converter. Therefore, it is considered that the preferable compression ratio is up to $\frac{3}{4}$.

FIG. 6 shows a case where the compression ratio is $\frac{3}{4}$, and FIG. 6(a) shows the relation between an input level and an output signal, and FIG. 6(b) shows the ROM table of the modification circuit, which has 5 output bits. Two of them are decision output signals, and other three bits are error signals for operating a transversal filter.

Next, a transversal filter control (19 in FIG. 2, $19_I$ and $19_c$ in FIG. 3, 108 in FIG. 4) is described.

Conventionally, the ZF method (zero-forcing) has been used in a transversal filter control. The ZF method is described in "Automatic Equalization for Digital Communication" by R. W. Lucky, Bell System Technical Journal, 44, No. 4, pp. 547–588, 1965. In the ZF method, a tap coefficient is obtained by the steps of obtaining a sign of a decision signal and an error signal which shows sign of inter-symbol interference in a decision circuit, providing a product of the decision signal and the error signal after passing those signals in a delay circuit, and integrating the product.

However, when the ZF method is used in the present digital signal demodulator, it has the disadvantages that the convergence speed is too slow when an inter-symbol interference is large, and the pull-in range is narrow when the system becomes asynchronous. Those disadvantages come mainly from error of an error signal.

The MLE method has been proposed for overcoming the disadvantages of said ZF method. That MLE method is described in "Automatic Equalizer in 1.544 Mb/s PCM-FDM System" by H. Yamamoto and T. Endo in Rev. of the ECL (Electrical Communications Laboratory), vol. 23, No. 6, 1974. In the MLE method, the error information is used only when the error signal is at the maximum level, and the previous error information held in the previous timing is used except at the maximum error level. However, the prior MLE method has the disadvantage that the response of the control is not improved.

The transversal filter control circuit used in the present invention must satisfy a wide pull-in range, have excellent response characteristics, and the circuit must be implemented by digital elements.

The improved transversal filter control is described in accordance with FIGS. 7 through 12.

The important features of the improved transversal filter control are that (a) when an error is large, the prior MLE method is used, and when an error is small, the prior ZF method is used, and (b) the integration constant for integration for providing product of a decision signal and an error signal is adjustable depending upon amount of inter-symbol interference.

Figure 7:
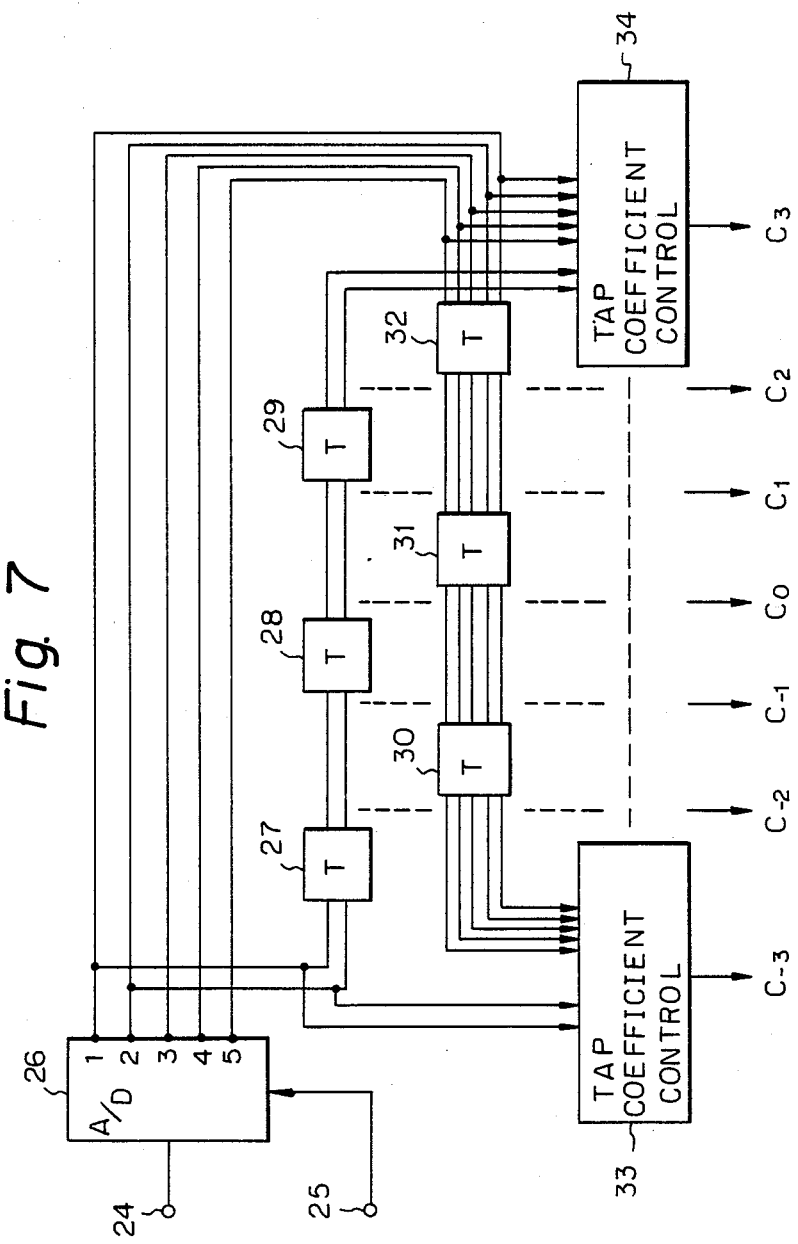
FIG. 7 is a block diagram of a transversal filter control for use in FIGS. 2, 3, or 4.

FIG. 7 shows a block diagram of the transversal filter control according to the present invention. In the figure, the numeral 24 is an input terminal of a demodulated signal, 25 is an input terminal of a clock signal, 26 is an A/D converter having 5 output bits, 27 through 32 are delay circuits, 33 and 34 are control circuits for providing tap coefficients for the tap $C_{-3}$ and $C_3$. The control circuits for the taps $C_{-2}$ through $C_2$ are not shown. Each control circuit 33 and 34 receives the 5 output bits from the A/D converter 26.

Figure 8:
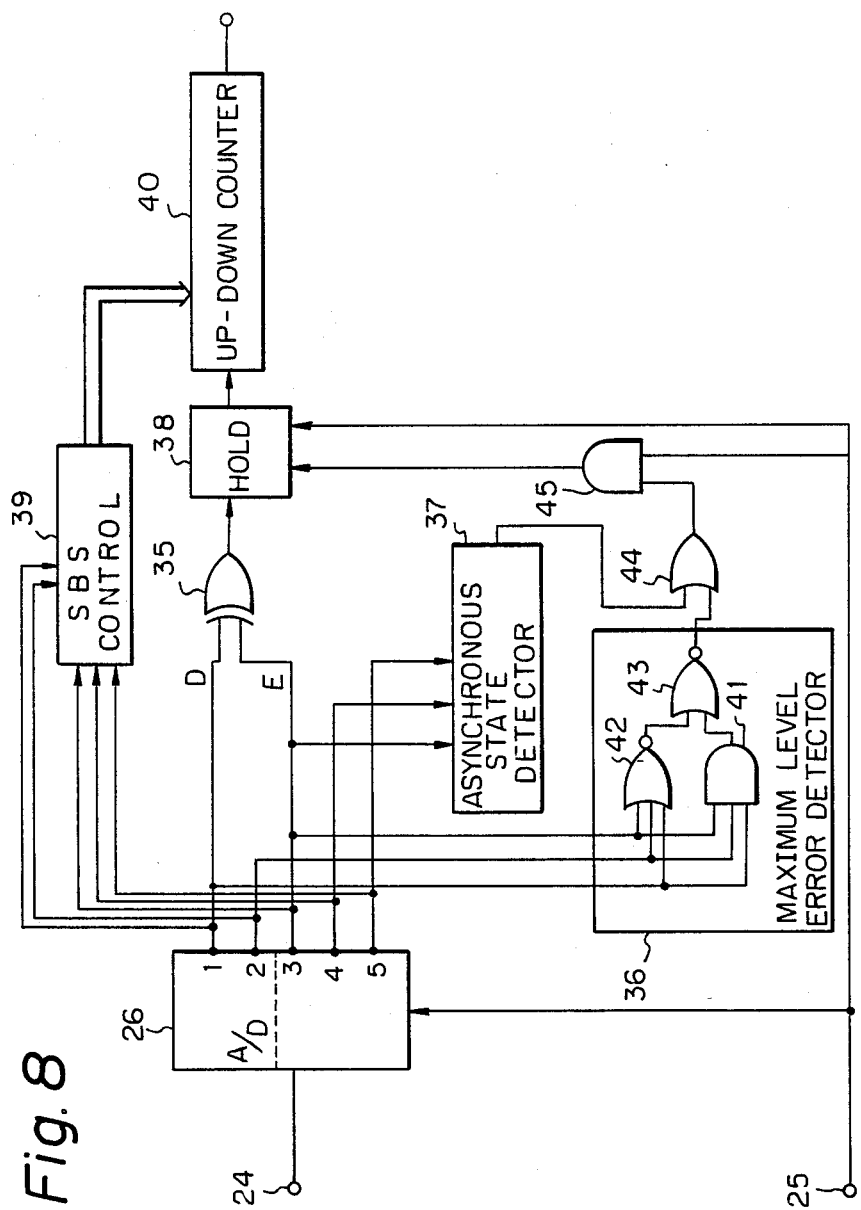
FIG. 8 is a block diagram of a tap coefficient control circuit of the transversal filter of FIG. 7.

FIG. 8 shows a brief block diagram of a control circuit for a single tap.

In the figure, the numeral 35 is an exclusive-OR circuit for providing the product of the decision signal of the 1 bit and the error signal of the 3 bit from the A/D converting 26, 36 is a maximum level error detector which provides an output signal when the error signals on the 3, 4, 5 bits are at the maximum level (000 or 111), 37 is an asynchronous state detector which tests the error signals on the 3, 4, and 5 bits, and provides an output signal "1" in a synchronized condition, or an output signal "0" in an asynchronized condition. The numeral 38 is a hold circuit which receives the output of the exclusive-OR circuit 35 (multiplier), and functions (1) to transmit the product (output of the exclusive-OR circuit 35) to an up-down counter 40, (2) to hold the product, or (3) stop the clock signal for operating the up-down counter 40, depending upon the output of the OR circuit 44 which receives the output of the asynchronous state detector 37 and the output of the maximum level error detector 36, through the AND circuit 45. The numeral 39 is a shift bit select (SBS) control circuit which receives the decision signals (bit 1 and bit 2), and the error signals bits 3, 4, and 5) of the A/D converter 26, and adjusts the integral constant of an integrator (up-down counter 40) so that when the error is large, the integral constant is small, and when the error is small, the integral constant is large. The adjustment of the integral constant is implemented by selecting an input bit position of the up-down counter 40. The numeral 40 is the up-down counter which functions as an integrator in a digital circuit, and the number of bit positions of the up-down counter 40 is adjusted by the shift bit select control circuit 39.

When the tap control FIG. 8 is used for the circuit of FIG. 2 or FIG. 3, the decision bits (1,2) of the A/D converter 26 are supplied by the cross polarization branch (A/D converter 15 and 15c), and the error bits (3,4,5) and the decision bits (1,2), namely full bits of the A/D converter (26) are supplied by the main branch A/D converter (14). So, although a single A/D converter 26 is shown in FIG. 8 for the sake of the simplicity of the drawing, the above matter should be understood.

Figure 9:
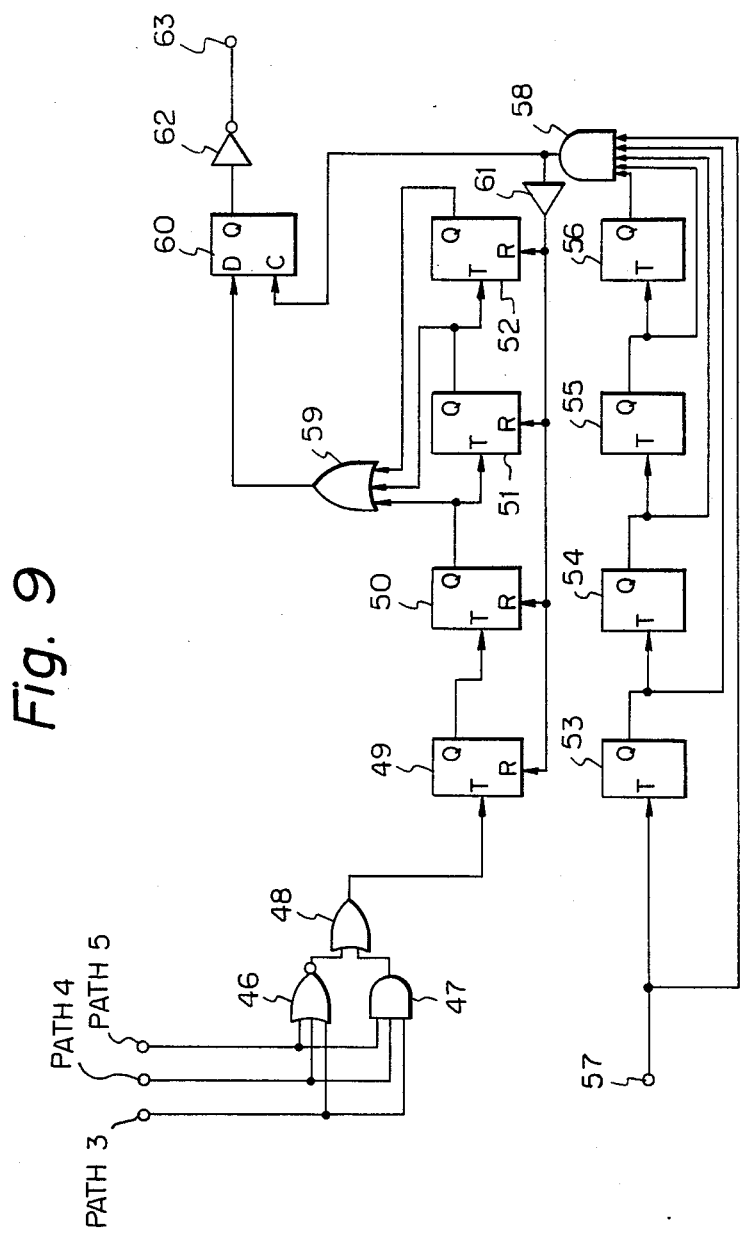
FIG. 9 is a block diagram of an asynchronous status detector in FIG. 8.

FIG. 9 shows a block diagram of an asynchronous state detector 37 which receives the signal on the path 3 which shows the sign of an inter-symbol interference, and the signals on the paths 4 and 5 which show the absolute value of the inter-symbol interference (error signal). The logic circuit having the NOR circuit 46, the AND circuit 47, and the OR circuit 48, provides the determination of an inter-symbol interference. When the output of the OR circuit 48 is "1", it is determined that the inter-symbol interference is large, and when the output of the OR circuit 48 is "0", it is determined that the inter-symbol interference is small. The output of the OR circuit 48 is applied to a counter having the flip-flops 49 through 52, which counts the number of the outputs of the OR circuit 48. In one embodiment, when there are more than 2 time slots having the signal "1" at the output of the OR circuit 48, among 16 ($=2^4$) time slots, it is determined that it is asynchronous, and the signal "0" is output at the output terminal 63.

In FIG. 9, the counter with the flip-flops 53 through 56, the OR-circuit 58, and the delay gate 61 provide a reset pulse which resets the flip-flops 49 through 52 in every 16 time slots period, and a trigger pulse for holding the flip-flop 60 for 16 time slots period.

The shift bit select control circuit 39 (SBS) is implemented by a combination logic circuit, which determines the length of the up-down counter 40 according to the signals path 1 through path 5.

The embodiment of relations between the signals path 1 through path 5, and the length of the up-down counter 40 is shown in the table 2.

TABLE 2

| Error signal | | | Decision signal | | | | |
|---|---|---|---|---|---|---|---|
| | | | 0 | 0 | 1 | 1 | path 1 |
| | | | 0 | 1 | 0 | 1 | path 2 |
| path 3 | path 4 | path 5 | | | | | |
| 1 | 1 | 1 | 16 | 17 | 17 | 16 | |
| 1 | 1 | 0 | 17 | 18 | 18 | 17 | |
| 1 | 0 | 1 | 18 | 19 | 19 | 18 | |
| 1 | 0 | 0 | 19 | 20 | 20 | 19 | |
| 0 | 1 | 1 | 19 | 20 | 20 | 19 | |
| 0 | 1 | 0 | 18 | 19 | 19 | 18 | |
| 0 | 0 | 1 | 17 | 18 | 18 | 17 | |
| 0 | 0 | 0 | 16 | 17 | 17 | 16 | |

For instance, when the signals path 1 through path 5 are (0,1,1,0,1) the length of the counter is 19.

In a practical circuit, the combination circuit of the table 2 provides the control signals CT1 through CT5 which are sent to the up-down counter 40.

Figure 10:
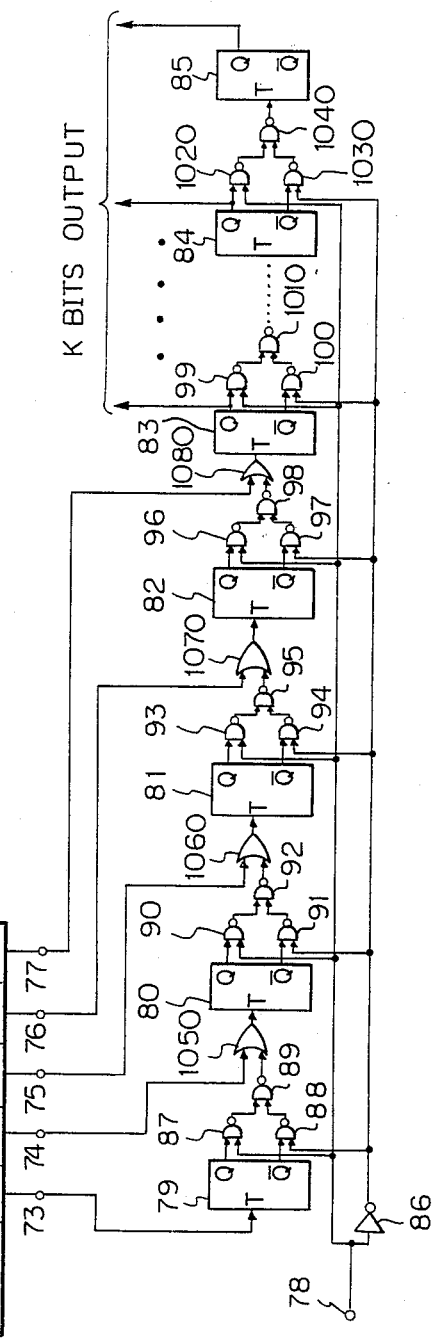
FIG. 10 is a block diagram of an up-down counter in FIG. 8.

FIG. 10 shows a block diagram of an up-down counter 40. The output of the shift bit select control circuit 39 is applied to the inputs 73 through 77 of the T-flip-flops 79 through 83. When the inter-symbol interference is small, the control signals at the input terminals 73 through 77 are (1,1,1,1,1), and all the T-flip-flops operate. This means that the number of bit positions of the counter is 20, and the T-flip-flops beginning from the flip-flop 79 operate. In that state, the sufficiently long integral time is taken, and the high quantization correlation is obtained.

On the other hand, when the inter-symbol interference is large, the control outputs are (0,0,0,0,1) at the inputs 73 through 77, and the up-down counter beginning from the T-flip-flop 83 operates. In this case, the number of bit positions of the counter is 16, and the integration time is the shortest, and the response speed is the highest. The terminal 78 receives the control signal which determines up-counter, or down-counter. The output of the up-down counter is provided by K number of bit-positions of the up-down counter, beginning from the most significant bit (MSB), depending upon the required number of bits for a tap coefficient control signal.

It should be noted that the description of FIGS. 8 through 10 is directed to the tap coefficient control circuit for one tap (one of $C_{-3}$ through $C_3$), and N number of the same circuits are enough for providing tap coefficients for N taps. In this case, it should be noted that the asynchronous state detection circuit 37 in FIG. 8 may be common to all the control circuits.

Figure 11:
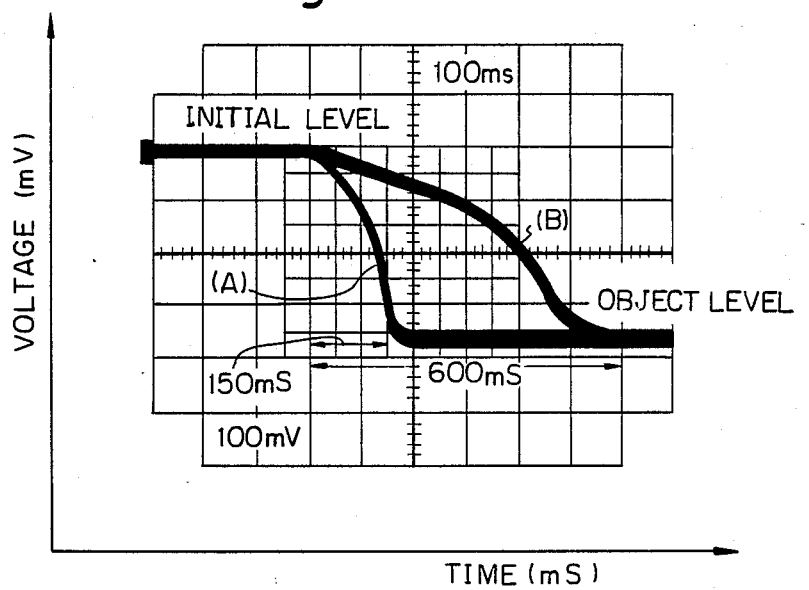
FIG. 11 shows the experimental curves of the effect of the present invention.

FIG. 11 shows the experimental curves of the transversal filter control according to the present invention, in which the horizontal axis shows the convergence time, and the vertical axis shows the level of the control signal. The curves are taken by measuring the level of the control signal after a predetermined cross polarization interference is applied to the cross polarization interference canceller of FIG. 2. In FIG. 11, the curve A shows the result of the present invention, and the curve B shows the result of the prior ZF method. As shown in the figure, the convergence time according to the present invention is 150 mS (curve A), while the convergence time of the prior ZF method is 600 mS (curve B). Therefore, it should be appreciated that the convergence time of a transversal filter control is considerably shortened by $\frac{1}{4}$ in the present invention.

From the foregoing it will now be apparent that a new and improved digital signal demodulation system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A digital signal demodulation system which cancels an interference, in which a common radio frequency is used for both a vertical polarization wave and a horizontal polarization wave, comprising:
    a first demodulator for demodulating a first polarization signal;
    a second demodulator for demodulating a second polarization signal;
    a first A/D converter coupled with an output of said first demodulator, operating with a clock signal regenerated by said first demodulator;
    a second A/D converter coupled with an output of said second demodulator, and said second A/D converter operating with the clock signal regenerated by said first demodulator;
    a first transversal filter coupled with an output of said second A/D converter for providing a compensation signal from said second A/D converter output;
    a first combiner coupled with an output of said first A/D converter and an output of said first transversal filter;
    a first control coupled with an output of said first combiner and the output of said second A/D converter, for adjusting tap coefficients of said first transversal filter; and
    an output terminal coupled with the output of said first combiner.

2. A digital signal demodulation system according to claim 1, further comprising:
    a third A/D converter coupled with the output of said second demodulator, operating with a clock signal regenerated by said second demodulator;
    a fourth A/D converter coupled with the output of said first demodulator, operating with the clock signal regenerated by said second demodulator;
    a second transversal filter coupled with an output of said fourth A/D converter for providing a compensation signal from said first polarization signal;
    a second combiner coupled with an output of said third A/D converter and an output of said second transversal filter;
    a second control coupled with an output of said second combiner and the output of said fourth A/D converter, for adjusting tap coefficients of said second transversal filter; and
    a second output terminal coupled with the output of said second combines to provide a demodulated second polarization signal.

3. A digital signal demodulation system according to claim 2, wherein said first control for adjusting tap coefficients of said first transversal filter comprises:
    a multiplier for providing a product of a sign of a decision signal of said first A/D converter, and a sign of an error signal provided by said third A/D converter;
    a maximum level error detector for detecting if said error signal is at a maximum level;
    an asynchronous state detector to detect if the decision signal at the output of said first A/D converter is in an asynchronous state;
    a hold circuit for holding an output of said multiplier;
    a digital signal integrator for integrating an output of said hold circuit;
    a shift bit select control circuit for adjusting an integral constant of said digital signal integrator, depending upon said decision signal and said error signal, and said shift bit select control circuit adjusting the integral constant of said digital signal integrator so that the integration constant is small when said decision signal and said error signal are large, and said integration constant is large when said decision signal and said error signal are small;
    an OR circuit for providing a logical sum of said asynchronous state detector and said maximum level error detector;
    said hold circuit holding a previous state when said OR circuit does not provide an output signal, and merely passing an input signal to output when said OR circuit provides an output signal.

4. A digital signal demodulation system according to claim 3, wherein said shift bit select control circuit adjusts the integration constant of said digital signal integrator by selecting an input terminal of said integrator.

* * * * *